(12) United States Patent
Ueki et al.

(10) Patent No.: US 8,431,204 B2
(45) Date of Patent: Apr. 30, 2013

(54) ACOUSTIC PART AND METHOD FOR MANUFACTURING THE SAME

(75) Inventors: Takuya Ueki, Tokyo (JP); Nobuyuki Osugi, Tokyo (JP)

(73) Assignee: Japan Gore-Tex Inc., Tokyo (JP)

( * ) Notice: Subject to any disclaimer, the term of this patent is extended or adjusted under 35 U.S.C. 154(b) by 286 days.

(21) Appl. No.: 12/999,788

(22) PCT Filed: Jun. 19, 2009

(86) PCT No.: PCT/JP2009/061186
§ 371 (c)(1),
(2), (4) Date: Jan. 24, 2011

(87) PCT Pub. No.: WO2009/154268
PCT Pub. Date: Dec. 23, 2009

(65) Prior Publication Data
US 2011/0117304 A1   May 19, 2011

(30) Foreign Application Priority Data
Jun. 20, 2008   (JP) .................. 2008-162382

(51) Int. Cl.
*B29D 22/00* (2006.01)
*B29D 23/00* (2006.01)
*B32B 1/08* (2006.01)
*B32B 39/00* (2006.01)

(52) U.S. Cl.
USPC ....... 428/36.5; 428/34.1; 428/35.7; 428/36.6; 428/36.7; 428/40.1; 428/41.8; 156/247; 156/249

(58) Field of Classification Search ................ 428/36.5, 428/34.1, 35.7, 36.6, 36.7, 40.1, 41.8; 156/247, 156/249
See application file for complete search history.

(56) References Cited

FOREIGN PATENT DOCUMENTS

| JP | 06-296930 | 10/1994 |
|---|---|---|
| JP | 08-079865 | 3/1996 |
| JP | 2003-055645 | 2/2003 |
| JP | 2003-255390 | 9/2003 |
| JP | 2005-236573 | 9/2005 |
| JP | 2007-081881 | 3/2007 |
| JP | 2007-184952 | 7/2007 |

OTHER PUBLICATIONS

International Search Report from PCT/JP2009/061186.

Primary Examiner — Michael C Miggins
(74) Attorney, Agent, or Firm — Richard W. Ellis

(57) ABSTRACT

An object is to provide a structure in which when a waterproof filter having an adhesive layer 1 attached thereto is attached to a housing of an electronic device, the adhesive layer 1 hardly rides onto a stepped portion 13. An acoustic part includes a housing 11 having at least one sound hole 12, an adhesive layer 1 formed into a frame shape, and a waterproof filter attached so as to cove the sound hole 12 with the adhesive layer 1 interposed therebetween, wherein the housing 1 is provided with a step position 13 for allowing the waterproof filter to engage therewith or a stepped portion 13 as a marker showing an attachment position of the waterproof filter, and an outer peripheral portion of the frame-shaped adhesive layer 1 is positioned at an inner side than an outer peripheral portion of the waterproof filter.

10 Claims, 9 Drawing Sheets

ACOUSTIC PART AND METHOD FOR MANUFACTURING THE SAME

TECHNICAL FIELD

The present invention relates to an acoustic part having a waterproof filter, which an acoustic part is to be used in electronic devices requiring waterproofness and dust-proofness, particularly electronic devices each having an acoustic function; as well as manufacturing method for an acoustic part.

BACKGROUND ART

A housing of electronic devices, such as mobile phones having electroacoustic transducers, e.g., a loudspeaker, a microphone, and a receiver; compact radios; transceivers; portable music players; laptop computers; headphones; earphones; outdoor microphones; and digital cameras, is provided with at least one sound hole for allowing a sound to pass from the inside to the outside, or from the outside to the inside, of the housing. A waterproof filter (or a waterproof film) is attached to the sound hole for the main purpose of preventing water from entering the inside of the electronic device.

As an example of such a waterproof film, Patent Document 1 discloses a mobile communication terminal in which electroacoustic transducers, such as a telephone receiver, a telephone transmitter, and a buzzer, are mounted to internal annular projections formed so as to surround small acoustic holes of a housing, the mobile communication terminal having a structure in which a piece of waterproof paper is provided between the small hole and the acoustic part; only the peripheral portion of the piece of waterproof paper is fixed between the internal annular projection and an annular interposed member; and each electroacoustic transducer is mounted to the annular interposed member so as to form a first front air chamber in the inside of the electroacoustic transducer, a second front air chamber between the acoustic part and the piece of waterproof paper, and a third front air chamber between the piece of waterproof paper and the housing.

As another example of such a waterproof film, Patent Document 2 discloses a structure in which a concave portion is provided on the end surface of a microphone accommodation member for accommodating a microphone main unit. A microphone attachment portion of a case is provided with an opening. A supporting frame is provided around the opening in a projecting manner, so as to allow the microphone accommodation member to be inserted and fixed therein. An annular projection is provided in the inside of the supporting frame and around the opening in a projecting manner, so as to fit the concave portion of the microphone accommodation member.

The waterproof film to be used for the acoustic applications as described above requires allowing a sound to pass therethrough with high efficiency, and therefore, it must be fixed while remaining the state capable of vibrating. That is, the fixation of the waterproof film may desirably be limited to the peripheral portion of the waterproof film as much as possible. As an example thereof, Patent Document 3 discloses a structure in which a protective membrane (or a waterproof film) is sandwiched between two adhesive support systems (e.g., double-sided pressure-sensitive adhesive tapes) each having an opening. With this structure, upstream sound pressure waves vibrate the protective membrane, and the solid borne energy (i.e., mechanical vibration) of the protective membrane, which has been generated by the vibration, is converted into downstream sound pressure waves, resulting in low acoustic loss/attenuation.

A waterproof film is attached to at least one sound hole in the housing of electronic devices such as mobile phones. Electronic devices such as mobile phones are increasingly reduced in size and thickness, and accordingly, the waterproof film is required to be reduced in size and to be improved in accuracy for its attachment position.

To improve the accuracy in the positioning of a waterproof film or an electroacoustic transducer, it is contemplated that a stepped portion is formed in the housing of electronic devices so as to guide the waterproof film and the electroacoustic transducer (e.g., Patent Document 4). In this connection, such a stepped portion does not necessarily completely fit the waterproof film, and may be formed with some allowance as shown in FIG. 4 of Patent Document 4. In such a case, the stepped portion may not necessarily contribute directly to the positioning of the waterproof film, but is useful as a marker indicating the attachment position of the waterproof film.

PRIOR ART DOCUMENTS

Patent Documents

Patent Document 1: Japanese Patent Laid-open Publication (Kokai) No. Hei 7-131375 (FIGS. 1 and 2)
Patent Document 2: Japanese Patent Laid-open Publication (Kokai) No. Hei 5-219163 (FIG. 1)
Patent Document 3: Japanese Patent Laid-open Publication (Kohyo) No. 2003-503991 (paragraph 0025, FIGS. 4 and 8)
Patent Document 4: Japanese Patent Laid-open Publication (Kokai) No. Hei 8-79865 (paragraph 0018, FIG. 4)

DISCLOSURE OF THE INVENTION

Problems to be Solved by the Invention

However, even if a stepped portion is provided in the housing, it is not easy in practice to attach a waterproof film reduced in size. Taking, as an example, a waterproof filter (one at least including a waterproof film as a constituent member) as described in FIG. 4 of Patent Document 3, FIGS. 10 and 11 show a cross section of the waterproof filter attached to the housing.

In FIGS. 10 and 11, numerals 1 and 3 represent adhesive layers; numeral 2 represents a waterproof film; numeral 11 represents a housing; numeral 12 represents a sound hole; and numeral 13 represents a stepped portion. FIG. 10 shows the case where the waterproof film 2 has been successfully attached. FIG. 11 shows an example where, when the waterproof filter (or the waterproof film 2) having the adhesive layers 1 and 3 formed thereon is attached to the housing 11, a portion of the adhesive layer 1 rides onto the stepped portion 13 due to a slight position deviation.

If the adhesive layer 1 rides onto the stepped portion 13, it is very difficult to remove and reattach the adhesive layer 1. This is because it is not easy to peel off the adhesive layer 1 once having adhered to the stepped portion 13, and if an attempt is made to forcibly peel off the adhesive layer 1, the thin waterproof film 2 may be damaged. If a mobile phone is completed while the adhesive layer 1 having ridden onto the stepped portion 13 is unnoticed, water leakage may occur through the portion in which the adhesive layer 1 has ridden onto the stepped portion 13.

The above problem may basically be caused in the same manner, regardless of whether the attachment process of a waterproof filter is carried out manually or automatically. The attachment process may often be carried out manually for electronic devices that frequently change in model, such as mobile phones, and therefore, the workers bear a great burden. The fact that the workers cannot visually check the adhesive layer 1 also contributes to such a great burden.

In view of the above circumstances, it is an object of the present invention to provide a structure of an acoustic part having a stepped portion for, for example, engaging with a waterproof filter having an adhesive layer, in which structure the adhesive layer hardly rides onto the stepped portion when the waterproof filter is attached to the acoustic part.

Means of Solving the Problems

The acoustic part of the present invention, which can attain the above object, comprises a housing having at least one sound hole, an adhesive layer formed into a frame shape, and a waterproof filter attached so as to cover the sound hole with the adhesive layer interposed therebetween, wherein the housing is provided with a stepped portion for allowing the waterproof filter to engage therewith or a stepped portion as a marker showing an attachment position of the waterproof filter, and an outer peripheral portion of the frame-shaped adhesive layer is positioned at an inner side than an outer peripheral portion of the waterproof filter.

In a preferred embodiment, the waterproof filter comprises a waterproof film composed of a fluororesin film.

In a recommended embodiment, the fluororesin film is composed of porous polytetrafluoroethylene film.

The waterproof filter may further comprise a frame member attached to the waterproof film.

In a preferred embodiment, the peripheral portion of the waterproof film is folded back so that a valley is formed on the side of the adhesive layer.

In another embodiment, a liquid-repellent agent is added to a surface of the waterproof film.

The adhesive layer can be a double-sided pressure-sensitive adhesive tape.

The method for manufacturing an acoustic part of the present invention, which can attain the above object, comprises: forming an adhesive layer into a frame shape on a release sheet; covering the adhesive layer with the waterproof filter; cutting the waterproof filter at an outer side than an outer peripheral portion of the frame-shaped adhesive layer; removing the release sheet from the adhesive layer; and attaching the adhesive layer side of the waterproof filter to a housing having at least one sound hole.

The other method for manufacturing an acoustic part of the present invention, which can attain the above object, comprises: forming an adhesive layer into a frame shape on a release sheet; covering the frame-shaped adhesive layer with a waterproof filter formed into a larger size than that of the frame-shaped adhesive layer; removing the release sheet from the adhesive layer; and attaching the adhesive layer side of the waterproof filter to a housing having at least one sound hole.

Effects of the Invention

The acoustic part and the method for manufacturing the acoustic part according to the present invention make it possible to provide a structure of an acoustic part having a stepped portion to, for example, engage with a waterproof filter having an adhesive layer, in which the adhesive layer hardly rides onto the stepped portion at the time of the attachment of the waterproof filter. This makes it possible to improve the efficiency at the step of attaching a waterproof filter and also to reduce the rate of defects in the acoustic part, such as water leakage.

MODE FOR CARRYING OUT THE INVENTION

The acoustic part and the method for manufacturing the same according to the mode for carrying out present invention will hereinafter be described in detail with reference to the drawings.

Figure 1:
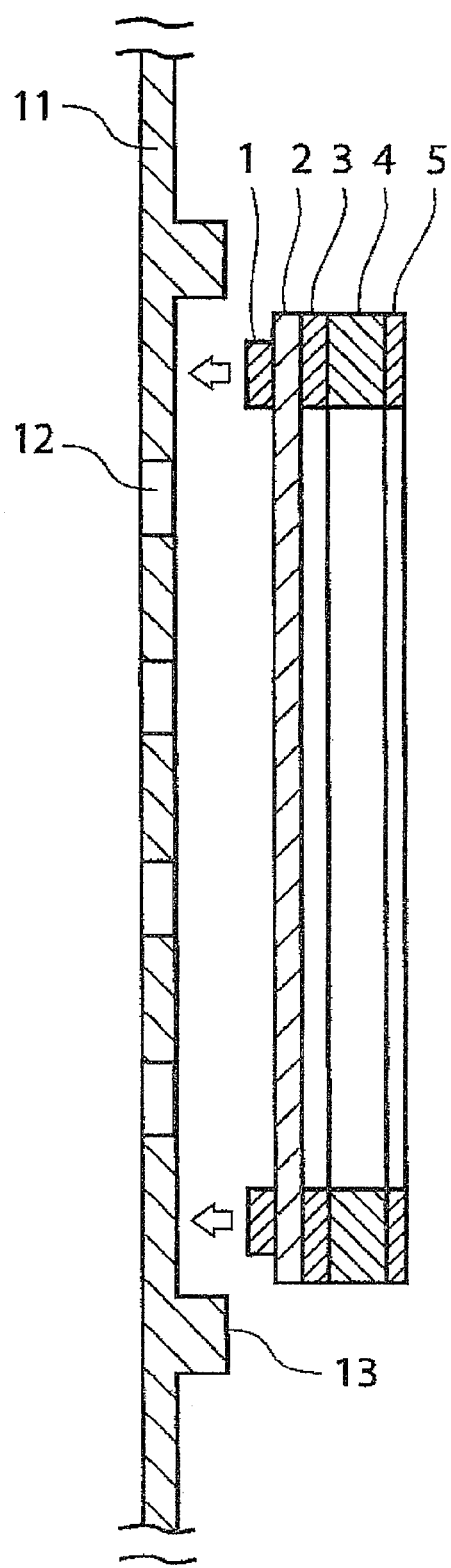
FIG. 1 is a cross-sectional view showing an acoustic part according to the mode for carrying out the present invention.

FIG. 1 is a cross-sectional view of an acoustic part according to the mode for carrying out the present invention, and shows the state just before a waterproof filter is attached to a housing. In FIG. 1, an object shown on the observer's left of the drawing is a housing 11, which is an external case of, for example, an electronic device. In the housing 11, there are formed two or more holes for allowing a sound to pass therethrough, i.e., sound holes 12. The number of the sound holes 12 is not limited to one, but may be two or more. In the housing 11, a stepped portion 13 is formed so as to engage with a waterproof filter as described later or to serve as a marker indicating the attachment position of the waterproof filter.

In FIG. 1, an object shown on the observer's right of the drawing is a waterproof filter, which is attached with an adhesive layer interposed so as to cover the sound holes 12. More specifically, an adhesive layer 1, a waterproof film 2, an adhesive layer 3, a frame member 4, and an adhesive layer 5 are stacked in layers in this order, starting from the side facing the housing 11. In this connection, the "waterproof filter" as used herein refers to a member having a waterproofing function, and corresponds to the waterproof film 2 in this mode for carrying out the present invention. However, when there is provided, together with the waterproof film 2, a part to be attached, such as a frame member 4 described later, the waterproof filter includes this part. In this connection, to describe the adhesive layer 5, FIG. 1 shows an example in which the adhesive layer 5 is provided. The adhesive layer 5, however, is used, if necessary, for example, in the case where the waterproof filter and a housing 21 of a loudspeaker described later, while being integrally attached to each other, are attached to the housing 11. Thus, as shown later in FIG. 8, the adhesive layer 5 may not be used.

The adhesive layers 1 and 3, and the adhesive layer 5, are formed into frame shapes, each opening of which has a function to allow a sound to pass therethrough. The smaller the area of the portion of the waterproof film 2, at which portion the waterproof film 2 is fixed by the adhesive layer 1 or the adhesive layer 3, the larger the area of the portion of the waterproof film 2, in which portion the waterproof film 2 can vibrate, and therefore, the higher the passing efficiency of the sound.

The frame member 4 is interposed as a spacer between the waterproof film 2 and an electroacoustic transducer (described later), such as a loudspeaker or a microphone. The frame member 4 (i.e., the spacer) has the effect of preventing a rattle from occurring due to the contact of the waterproof film 2 with the electroacoustic transducer, or the effect of improving the acoustic characteristics by forming a space between the waterproof film 2 and the electroacoustic transducer. Thus, the frame member 4 is a part, the use of which is preferred.

The frame member 4 also has a function to support the relatively flexible waterproof film 2 when attached to the waterproof film 2 with the adhesive layer 3 interposed therebetween. In this connection, as shown in FIG. 1, if the end portions of the waterproof film 2, the adhesive layer 3, and the frame member 4 are aligned, the adhesive layer 3 hardly becomes attached to the stepped portion 13. In this connection, as shown later in FIG. 4(a), if the outer peripheral portion of the adhesive layer 3 is positioned at an inner side than the outer peripheral portion of the waterproof film 2 or the outer peripheral portion of the frame member 4, the adhesive layer 3 more hardly becomes attached to the stepped portion 13.

As shown in FIG. 1, even if the position is deviated to some extent when the waterproof filter is attached to the housing 11, the engagement of the outer peripheral portion of the waterproof filter with the stepped portion 13 makes it possible that the waterproof filter is brought into contact with the housing 11 at a predetermined position so as to cover the sound holes 12 and is attached to the housing 11 by the action of the adhesive layer 1.

The waterproof filter is allowed to engage with the stepped portion 13. That is, the waterproof filter does not necessarily need to completely fit the stepped portion 13, and may be formed with some allowance. Further, the stepped portion 13 may have no function to guide the waterproof filter, but even in such a case, the stepped portion 13 is useful as a marker indicating the attachment position of the waterproof filter.

Alternatively, when the frame member 4 is used and the outer diameter of the waterproof film 2 is smaller than the outer diameter of the frame member 4, the waterproof film 2 may not fit the stepped portion 13, but the frame member 4 may fit the stepped portion 13.

As the most distinctive feature of the present invention, the outer peripheral portion of the frame-shaped adhesive layer 1 is positioned at an inner side than the outer peripheral portion of the waterproof filter. Accordingly, even if the position is deviated to some extent at the time of the attachment of the waterproof filter, it is less probable than a conventional process that the adhesive layer 1 becomes attached to the stepped portion 13. For this reason, it is unlikely that adhesion may accidentally be caused by the worker while the adhesive layer 1 rides onto the stepped portion 13. This considerably improves the mounting efficiency of the waterproof filter. This also makes it possible to provide an acoustic part with a high waterproof reliability. In this connection, when the outer peripheral portion of the waterproof film 2 and the outer peripheral portion of the frame member 4 are different from each other in position, for example, and therefore, when the waterproof film 2 and the frame member 4 are different from each other in size, the outermost peripheral portion is the outer peripheral portion of the waterproof filter.

The distance between the outer peripheral portion of the waterproof filter and the outer peripheral portion of the adhesive layer 1 may preferably be 0.1 mm or longer. The reason why the lower limit of the distance is set to be 0.1 mm is that when the distance is shorter than 0.1 mm, the effect of preventing the adhesive layer 1 from riding onto the stepped portion 13 is not substantially exhibited. The distance may more preferably be 0.2 mm or longer, still more preferably 0.3 mm or longer. When the waterproof filter is attached manually, the distance may preferably be 0.5 mm or longer, more preferably 0.7 mm or longer, and still more preferably 1.0 mm or longer.

On the other hand, the upper limit of the distance between the outer peripheral portion of the waterproof filter and the outer peripheral portion of the adhesive layer 1 is not particularly limited. There is, however, a substantial upper limit of the distance under the circumstances in which the waterproof filter is required to be reduced in size. On the condition that the waterproof filter is circular and approximately has a diameter of from 10 to 20 mm, the upper limit of the distance is, for example, 1 mm or shorter, more preferably 0.5 mm or shorter. This is because when the distance between the outer peripheral portion of the waterproof filter and the outer peripheral portion of the adhesive layer 1 is too long, that is, when the outer diameter of the adhesive layer 1 is too small, the adhesion area between the housing 11 and the waterproof filter becomes decreased, and therefore, it is concerned that the waterproof reliability may be deteriorated. In this connection, the reason why the adhesion area becomes decreased is that the inner diameter of the adhesive layer 1 is substantially restricted by the sizes and positions of the sound holes 12 of the housing 11.

Figure 2:
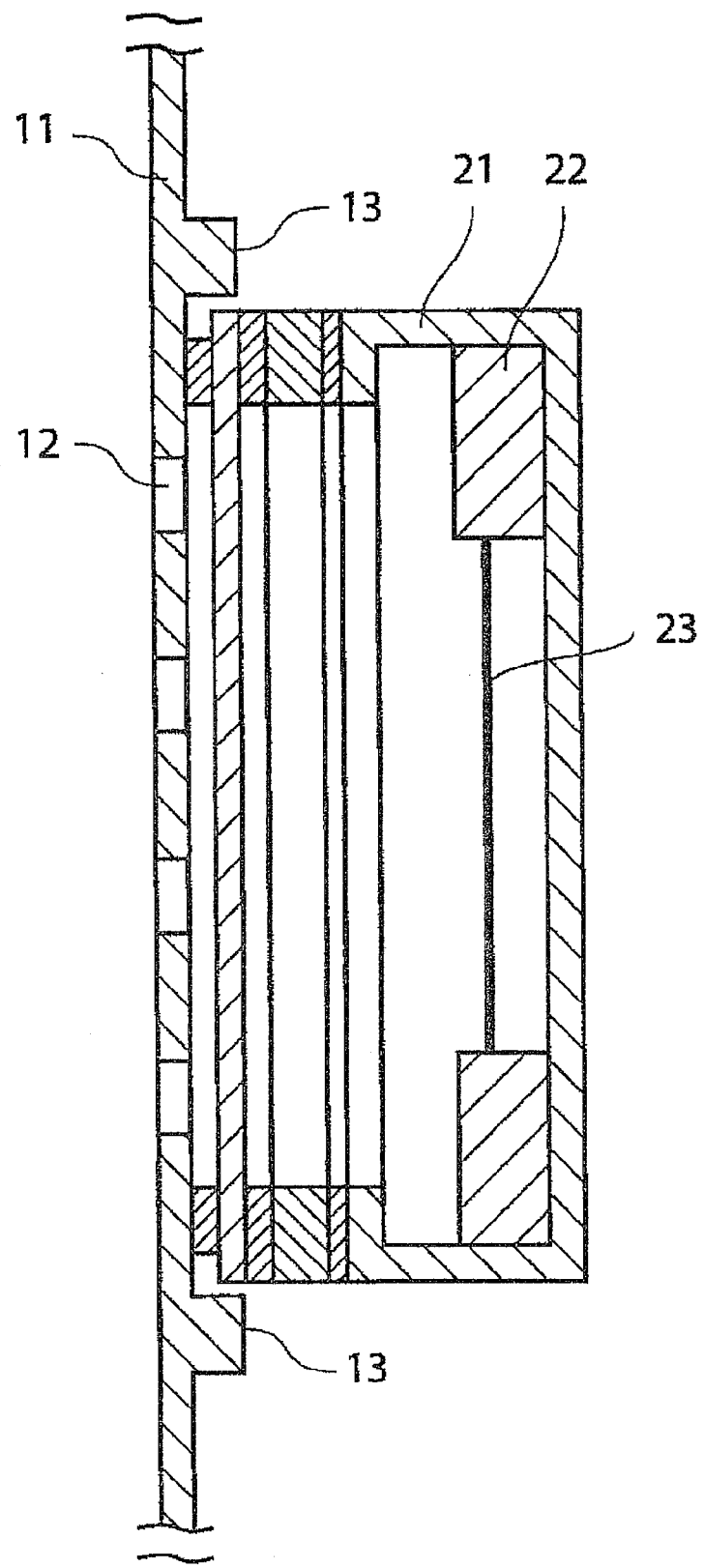
FIG. 2 is a cross-sectional view showing another acoustic part according to the mode for carrying out the present invention.

FIG. 2 shows an example of the use of an acoustic part according to this mode for carrying out the present invention, and it is a cross-sectional view showing the state in which a loudspeaker (i.e., an acoustic wave generator that generates a notification sound, such as a ring tone) to be used for mobile phones, which is an example of the electroacoustic transducer, is attached to the acoustic part. In FIG. 2, a diaphragm 23 supported by a supporting member 22 is provided in a housing 21 of the loudspeaker. The sound waves generated by the diaphragm 23 are emitted from the housing 21, and are propagated to the outside of the mobile phone through the waterproof film 2 and the sound holes 12.

In this mode for carrying out the present invention, the description was made in such an order that the waterproof filter is first attached to the housing 11 and the electroacoustic transducer is then attached to the waterproof filter. The description, however, is not limited to this order, and the present invention can also be carried out in such an order that the waterproof filter is first attached to the electroacoustic transducer and the waterproof filter is then attached to the housing 11.

Figure 3:
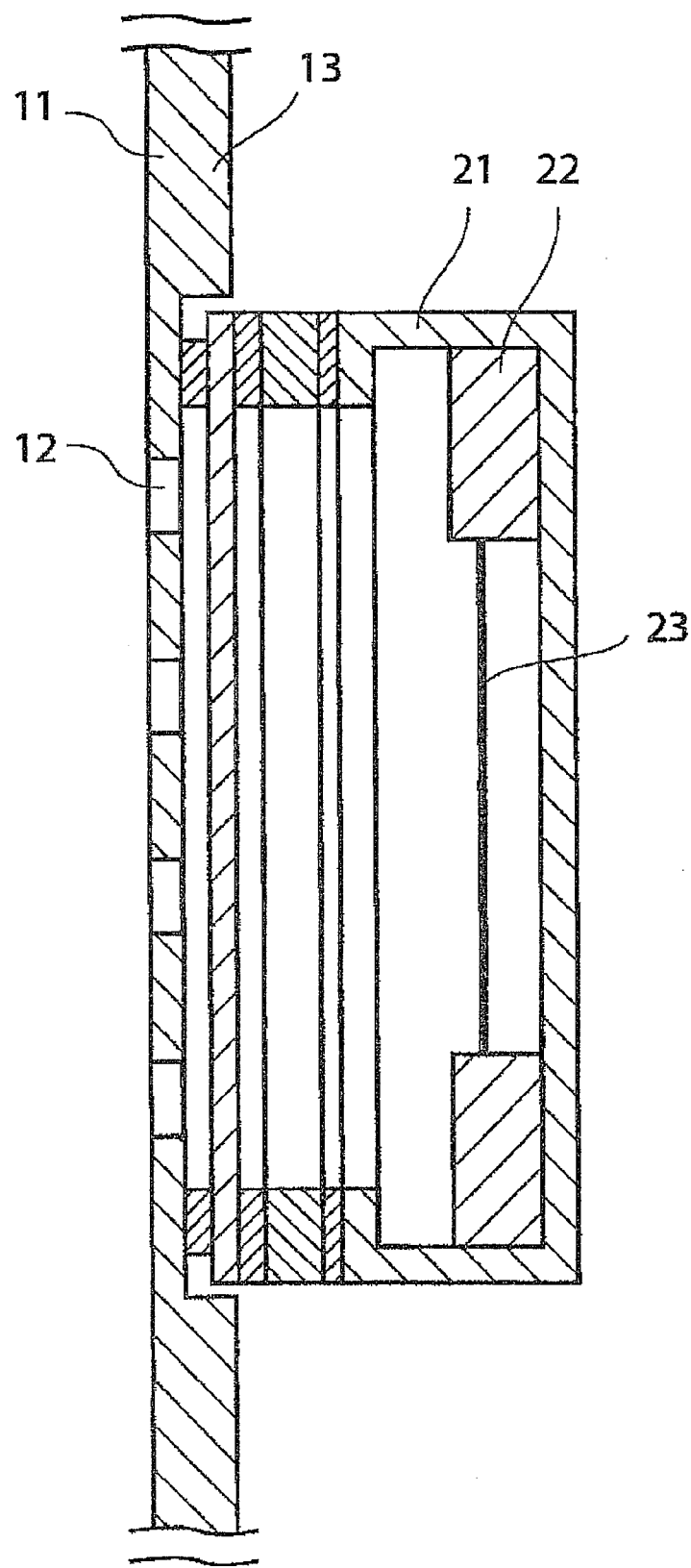
FIG. 3 is a cross-sectional view showing still another acoustic part according to the mode for carrying out the present invention.

FIG. 3 shows an example in which the shape of the stepped portion 13 is changed in the acoustic part shown in FIG. 2. In the acoustic part shown in FIG. 2, the stepped portion 13 is formed as a projection (or a convex portion) that surrounds the periphery of the waterproof filter, but is not limited to this mode. The present invention can also be carried out even when merely one step is provided as shown in FIG. 3.

Figure 4:
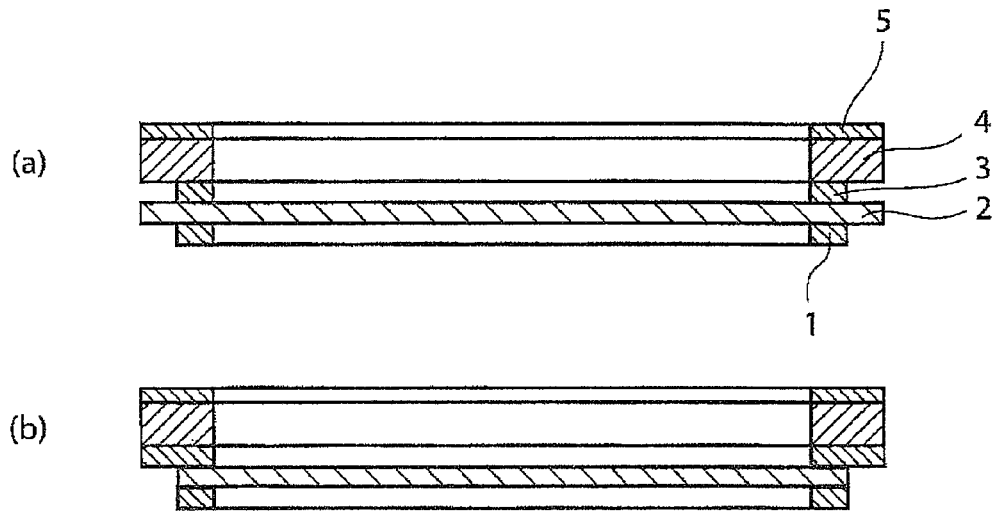
FIGS. 4(a) and (b) are cross-sectional views showing various acoustic parts according to the mode for carrying out the present invention.
Figure 5:
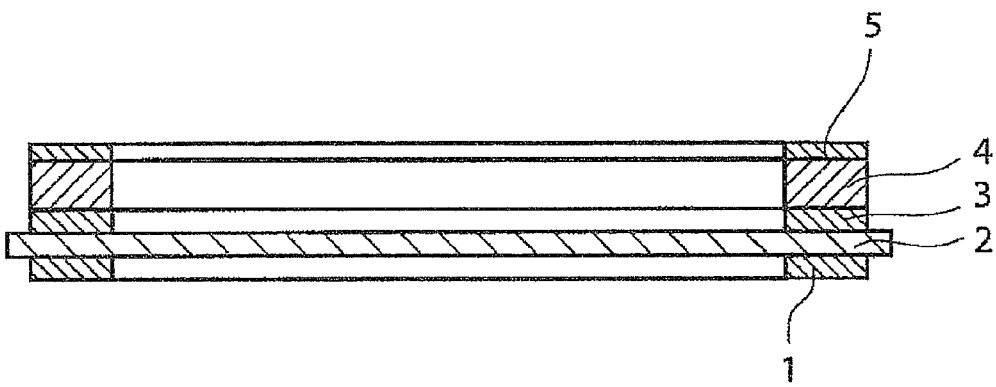
FIG. 5 is a cross-sectional view showing still another acoustic part according to the mode for carrying out the present invention.
Figure 6:
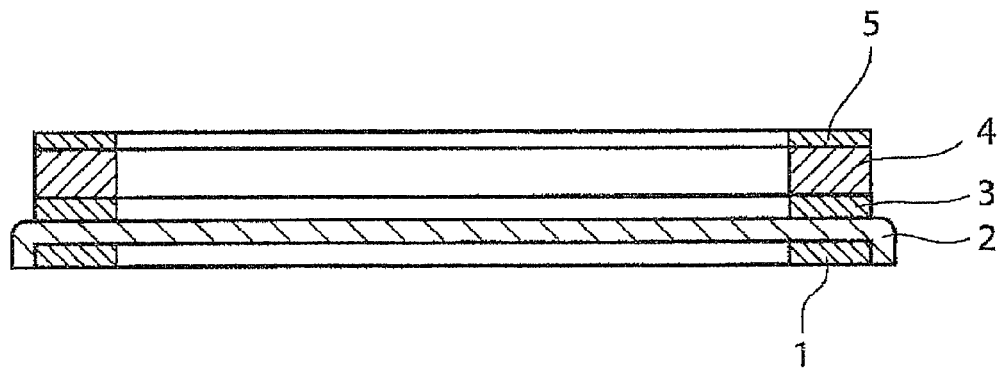
FIG. 6 is a cross-sectional view showing still another acoustic part according to the mode for carrying out the present invention.

FIGS. 4 to 6 respectively show some variations of the waterproof filter when the frame member 4 is used. As shown in FIG. 4(a), the outer peripheral portion of the adhesive layer 3 may be positioned at an inner side than the outer peripheral portion of the waterproof film 2. This makes it possible that while the end portions of the waterproof film 2 and the frame member 4 are guided by the stepped portion 13, the side surface of the adhesive layer 3 is prevented from becoming attached to the wall of the stepped portion 13.

Alternatively, as shown in FIG. 4(b), the adhesive layer 1 and the waterproof film 2 may be made in the same size. This shape is employed when the adhesive layer 1 and the waterproof film 2 are punched together to improve the production efficiency of the waterproof filter.

In this connection, in the case of FIG. 4(b), the bottom surface of the adhesive layer 3 is not entirely covered by the waterproof film 2. Consequently, when the waterproof filter is attached to the housing 11, the bottom surface of the adhesive layer 3 may accidentally make contact with the stepped portion 13, and therefore, similarly to the adhesive layer 1, it is concerned that the position of the waterproof filter may be deviated and the attachment efficiency of the waterproof filter may be deteriorated. It is, however, possible to eliminate these concerns by setting in advance the adhesion strength of the adhesive layer 3 lower than the adhesion strength of the adhesive layer 1. The reason why the adhesion strength of the adhesive layer 3 can be lower is that the adhesive layer 1 is required to have such a strong and secure adhesion force as to prevent external water from entering the filter, whereas it is sufficient that the adhesive layer 3 has only such an adhesion strength as to prevent the frame member 4 from being peeled off from the waterproof film 2.

FIG. 5 shows a mode in which only the end portion of the waterproof film 2 is projecting. Even when the waterproof film 2 has a low strength, this mode can be carried out by providing a reinforcing material, such as a net made of a thermoplastic resin, on one or both sides of the waterproof film 2. This makes it possible to attach the waterproof filter to the housing 11 without any influence of the adhesive layers 1, 3, and 5.

FIG. 6 shows a further modification of the waterproof filter of FIG. 5, in which the outer peripheral portion of the waterproof film 2 is folded back so that a valley is formed on the side of the adhesive layer 1. In this mode, the side surface of the adhesive layer 1 is covered by the waterproof film 2, and therefore, the adhesive layer 1 can be prevented, with improved certainty, from becoming attached to the wall of the stepped portion 13. Further, when the waterproof film 2 is made of an easily shrinkable material, such as porous polytetrafluoroethylene, the adoption of the structure shown in FIG. 6 makes the bent portion of the waterproof film 2 serve as a hook, so that the waterproof film 2 can be prevented from being shrunk and also the adhesive layer 1 can be prevented from being exposed.

Next, the methods for manufacturing the acoustic part according to this mode for carrying out the present invention will hereinafter be described.

Figure 7:
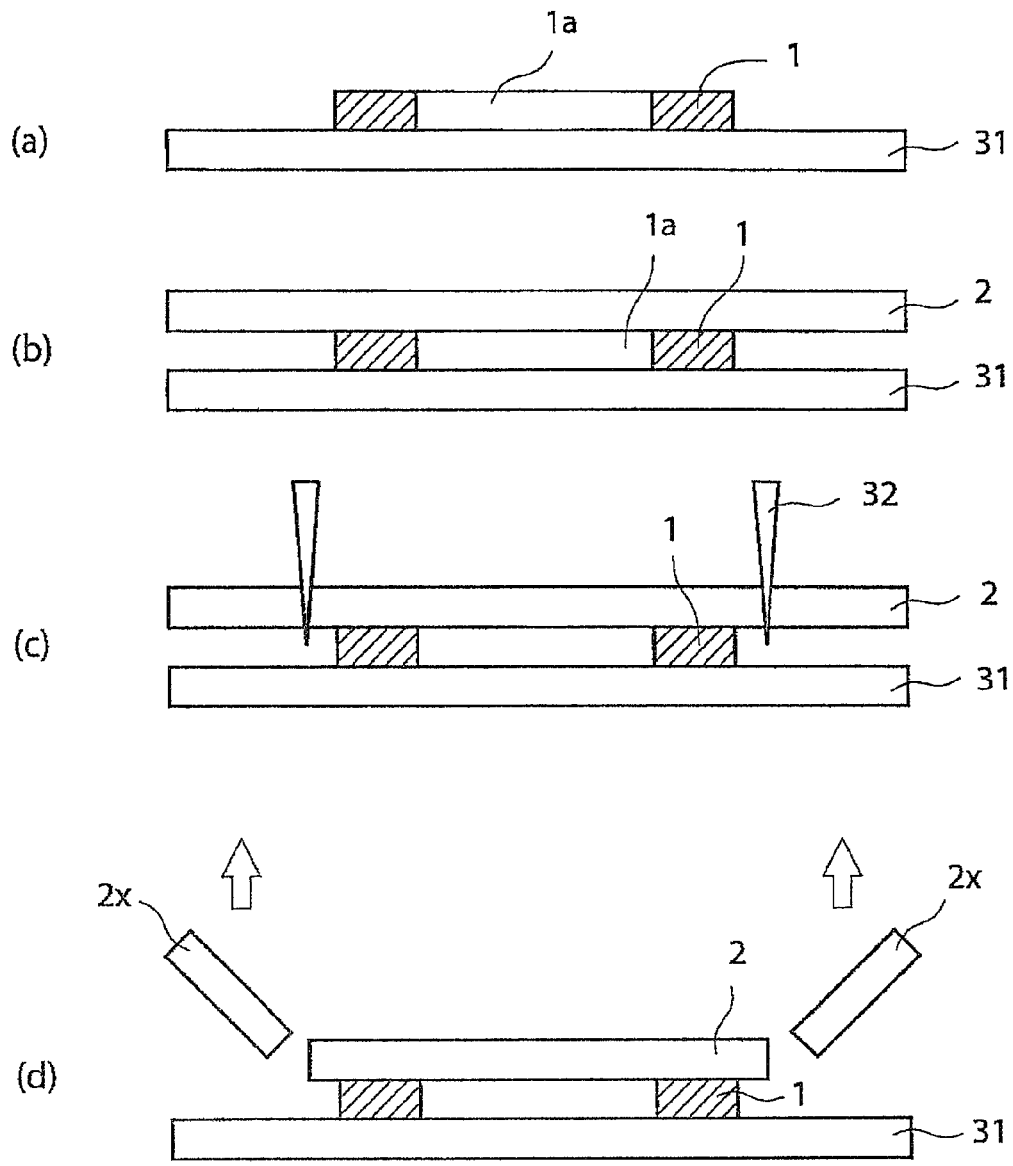
FIGS. 7(a) to (d) are a series of cross-sectional views showing a production process of an acoustic part according to the Example of the present invention.

FIG. 7 is a series of cross-sectional views showing a production process of the waterproof filter according to the mode for carrying out the present invention. First, as shown in FIG. 7(a), a release sheet 31 made of PET is prepared, and an adhesive layer 1 having an opening 1a is formed on the release sheet 31.

Next, as shown in FIG. 7(b), a waterproof film 2 made of porous polytetrafluoroethylene (hereinafter referred to as the "porous PTFE") is attached onto the adhesive layer 1.

Next, as shown in FIG. 7(c), the waterproof film 2 is cut at a predetermined position with a die cutting roll (blade) 32, so that the waterproof film 2 is formed into, for example, a circular shape. As a mater of course, the shape of the waterproof film 2 is not limited to a circular shape because it is determined depending upon the shape of an electroacoustic transducer to which the waterproof film 2 and other members are to be attached.

Then, as shown in FIG. 7(d), an unnecessary portion 2x of the waterproof film 2, which unnecessary portion is located outside the waterproof film 2, is removed. This makes it possible that the outer peripheral portion of the adhesive layer 1 is positioned at an inner side that the outer peripheral portion of the waterproof film 2.

In this connection, it is also possible to achieve the same object by, as well as the method described above, a method in which the waterproof film 2 formed into a larger size than that of the adhesive layer 1 is prepared in advance, and the adhesive layer 1 is covered with the waterproof film 2.

The waterproof filter prepared as described above is attached to the housing 11, whereby the acoustic part according to the mode for carrying out the present invention is completed.

Next, the adhesive layer 1 and the waterproof film 2, both of which are basic constituent members of the acoustic part according to the mode for carrying out the present invention as described above, the release sheet 31, which is used in the production process of the acoustic part, and the frame member 4, which may preferably be used, will hereinafter be described in more detail.

The adhesive layer 1 is formed into a frame shape. The shape of the frame is not particularly limited, but may be circular, elliptical, rectangular, or polygonal. Examples of the method of forming the frame-shaped adhesive layer 1 may include, for example, a screen printing method, a method in which a molten adhesive is transferred to the release sheet 31 with a gravure pattern roll, or a method in which a double-sided pressure-sensitive adhesive tape that has been cut into a frame shape in advance is used as the adhesive layer 1. As the double-sided pressure-sensitive adhesive tape, various types of tapes may be used, such as nonwoven-fabric-core double-sided pressure-sensitive adhesive tapes; PET-core double-sided pressure-sensitive adhesive tapes; foam-core double-sided pressure-sensitive adhesive tapes; and backingless double-sided pressure-sensitive adhesive tapes. In this connection, the "backingless-type double-sided pressure-sensitive adhesive tape" as used herein refers to a double-sided pressure-sensitive adhesive tape that does not have a backing material (or a core material) for the purpose of reinforcement or the like.

In this connection, the adhesive as used herein refers to an ordinary substance that is used to attach objects to each other, and may include those called "pressure-sensitive adhesives."

As the microscopic shape of the waterproof film 2, there may be used a net shape, a mesh shape, or a porous shape. As a material for forming the waterproof film 2, there may be used polyethylene, polypropylene, polystyrene, polyimide, or other polymers. It is recommended to use a film preferably made of a fluororesin having high waterproofness, more preferably porous polytetrafluoroethylene (porous PTFE). A porous PTFE film has not only high waterproofness but also small mass due to its porous structure, and therefore, it is suitable for applications in which a sound is allowed to pass therethrough.

The porous PTFE film is obtained by mixing PTFE fine powder with a forming aid to give a paste, forming the paste into a formed product, removing the forming aid from the formed product, and then stretching the formed product at a high temperature and a high rate, and further, if necessary, baking the formed product. A uniaxially stretched porous PTFE film has nodes (folded crystals) arranged in a thin-island manner perpendicularly to the stretching direction, and also has fibrils (linear molecule bundles in which folded crystals have been unraveled and pulled out by the stretching) oriented in a reed-screen manner along the stretching direction so as to connect the nodes. This results in a fibrous structure in which holes are formed from spaces defined by the fibrils and spaces defined by both the fibrils and the nodes. A biaxially stretched porous PTFE film has fibrils extending in a radial manner, and also has fibril-connecting nodes interspersed in an island manner. This results in a spider's web-like fibrous structure in which there are many spaces defined by both the fibrils and the nodes.

The waterproof film 2 may be a uniaxially stretched porous PTFE film or a biaxially stretched porous PTFE film, but it may preferably be a biaxially stretched porous PTFE film.

Examples of the material, other than PET, which can be selected to be used for the release sheet 31, may include, for example, resin films made of polyesters such as polybutyrene terephthalate, polyolefins such as polypropylene, polyethylene, and polymethylpentene, and polycarbonates; paper such as glassine paper, high-quality paper, coated paper, impregnated paper, and synthetic paper; and metal foils made of metals such as aluminum and stainless steel.

The release sheet 31 may desirably have a thickness of for example, from 10 to 100 µm, preferably from 25 to 50 µm. In order to improve the adhesiveness of the release sheet 31 with a pressure-sensitive adhesive, the surface of the release sheet 31 may have a release agent formed thereon, or may be subjected to corona discharge treatment, plasma treatment, flame plasma treatment, or other treatments, or may be provided with a primer layer. For the primer layer, there may be used any of polymer materials (i.e., "anchor coating agents") such as polyethylene, polypropylene, styrene-based copolymers, polyesters, polyurethanes, polyvinyl alcohol, polyethylenimine, polyacrylates, polymethacrylates, and modified products thereof.

When the waterproof film 2 is used, the surfaces inside the pores of the waterproof film 2 may preferably be coated with a liquid-repellent polymer. In this connection, a "liquid-repellent agent" as used in the claims and the specification refers to a substance having the property or the function of repelling liquid, and may include "water-repellent agents", "oil-repellent agents", and "water/oil-repellent agents." An explanation is given below taking a water/oil-repellent polymer as an example.

When the surfaces inside the pores of the waterproof film 2 have been coated in advance with a water/oil-repellent polymer, it is possible to prevent various contaminants, such as body oils, machine oils, beverages, and laundry detergents, from penetrating into, or being held in, the pores of the vent film. This is because these contaminants reduce the hydrophobicity of porous PTFE that may preferably be used for the vent film, resulting in a cause of deterioration in the waterproofness of the porous PTFE.

As the water/oil-repellent polymer, there may be used polymers each having fluorine-containing side chains. Water/oil-repellent polymers and a method of using them in porous PTFE films to give composites are disclosed in, for example, the International Publication No. WO 94/22928. An example thereof is described below.

As the water/oil-repellent polymer, there may preferably be used polymers each having fluorine-containing side chains (the fluorinated alkyl moiety thereof may preferably have from 4 to 16 carbon atoms), which are obtained by polymerizing fluoroalkyl acrylates and/or fluoroalkyl methacrylates, represented by the following general formula (I):

[Chemical Formula 1]

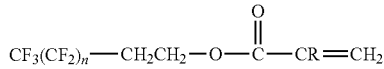

(1)

wherein n is an integer of from 3 to 13 and R is hydrogen or methyl group. To coat the inside of the pores of the above porous PTFE film with any of these polymer, an aqueous microemulsion of the polymer (an average particle diameter of from 0.01 to 0.5 µm) is prepared using a fluorine-containing surfactant (e.g., ammonium perfluorooctanate), and the pores of the porous PTFE film are impregnated with the aqueous microemulsion, followed by heating. As a result of the heating, the water and the fluorine-containing surfactant are removed, and at the same time, the polymer having fluorine-containing side chains are melted to coat the surfaces inside the pores of the porous PTFE film in such a manner that continuous pores are maintained, thereby making it possible to obtain the waterproof film 2 having high water repellency and high oil repellency.

Alternatively, as other water/oil-repellent polymers, there may also be used, for example, "AF polymer" (the product name of E.I. du Pont de Nemours and Company) and "Cytop" (the product name of Asahi Glass Co., Ltd.). To coat the surfaces inside the pores of the waterproof film 2 with each of these polymers, the polymer may be dissolved in an inert solvent, such as "Fluorinert" (the product name of Sumitomo 3M Limited), the porous PTFE film may be impregnated with the resulting solution, and then, the solvent may be removed by evaporation.

As a material for forming the frame member 4, there may be used foam base materials formed of urethane foam, silicone foam, acrylic foam, polyethylene foam, or other foams; PET base materials; silicone base materials; and nylon base materials. There may preferably be used materials obtained by applying a pressure-sensitive adhesive to one or both sides of the frame member 4, and these materials are available as commercial products (e.g., available from Rogers Inoac Corporation; product name, Poron).

EXAMPLES

The present invention will be described below in more detail by way of Examples, but the present invention is not limited to the following Examples. The present invention can be put into practice after appropriate modifications or variations within a range meeting the gists described above and below, all of which are included in the technical scope of the present invention.

Test Production Example 1

Preparation of Waterproof Film

A porous PTFE film having a thickness of 30 µm, an inner diameter of 10 mm, an outer diameter of 18 mm, and a porosity of 85% was prepared by forming a paste resin into a film, the paste resin being obtained by mixing 22 parts by weight of solvent naphtha with 100 parts by weight of polytetrafluoroethylene powder (fine powder) obtained by emulsion polymerization, removing the solvent naphtha by evaporation with heating the film-shaped paste-formed product to a temperature above the boiling point of the solvent naphtha, and then biaxially stretching the resulting product at a rate of 10% or higher per second at a temperature below the melting point of the polytetrafluoroethylene. Then, the porous PTFE film thus prepared was used as the waterproof film 2.

[Structure of Waterproof Filter]

Figure 8:
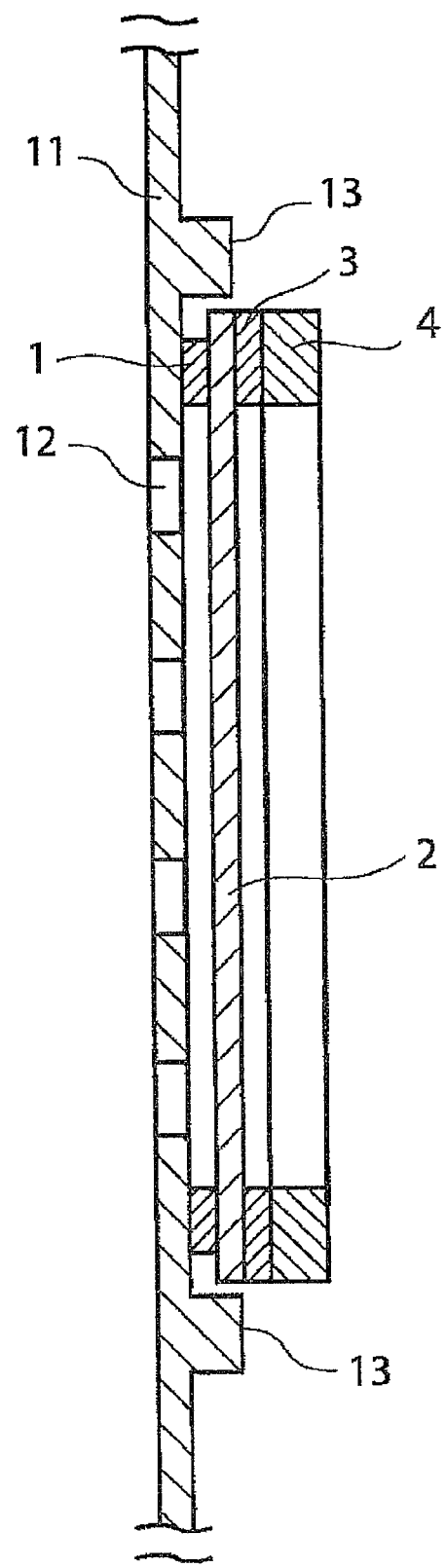
FIG. 8 is a cross-sectional view showing an acoustic part according to the Example of the present invention.

As shown in FIG. 8, the adhesive layer 1, the waterproof film 2, the adhesive layer 3, and the frame member 4 were stacked in layers in this order. As the adhesive layer 1, there was used a double-sided pressure-sensitive adhesive tape (available from Sumitomo 3M Limited; product number, 4393; hereinafter referred to as the "double-sided pressure-sensitive adhesive tape α") having a thickness of 0.2 mm, which was obtained by applying an acrylic pressure-sensitive adhesive to both sides of a PET film backing material. As the adhesive layer 2B, there was used a double-sided pressure-sensitive adhesive tape (available from Sumitomo 3M Limited; product number, ST-416P; hereinafter referred to as the "double-sided pressure-sensitive adhesive tape β") having a thickness of 0.125 mm, which was similarly obtained by applying an acrylic pressure-sensitive adhesive to both sides of a PET film backing material. As the frame member 4, there was used a PET film having a thickness of 250 μm. The frame member 4 is used as a spacer between the waterproof filter and the electroacoustic transducer.

Test Production Example 2

Figure 9:
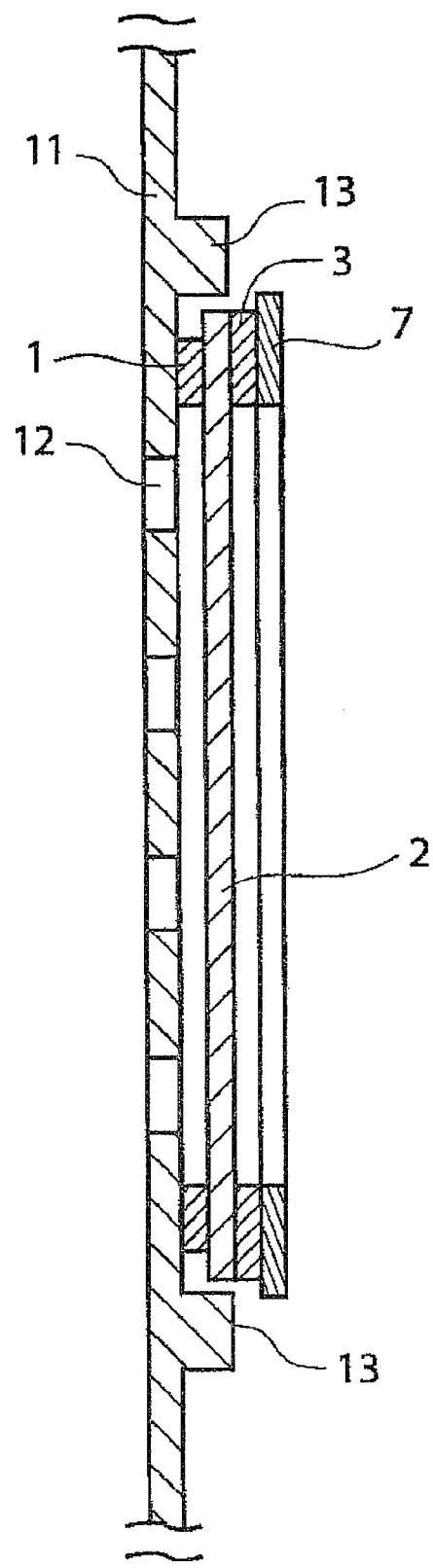
FIG. 9 is a cross-sectional view showing another acoustic part according to the Example of the present invention.
Figure 10:
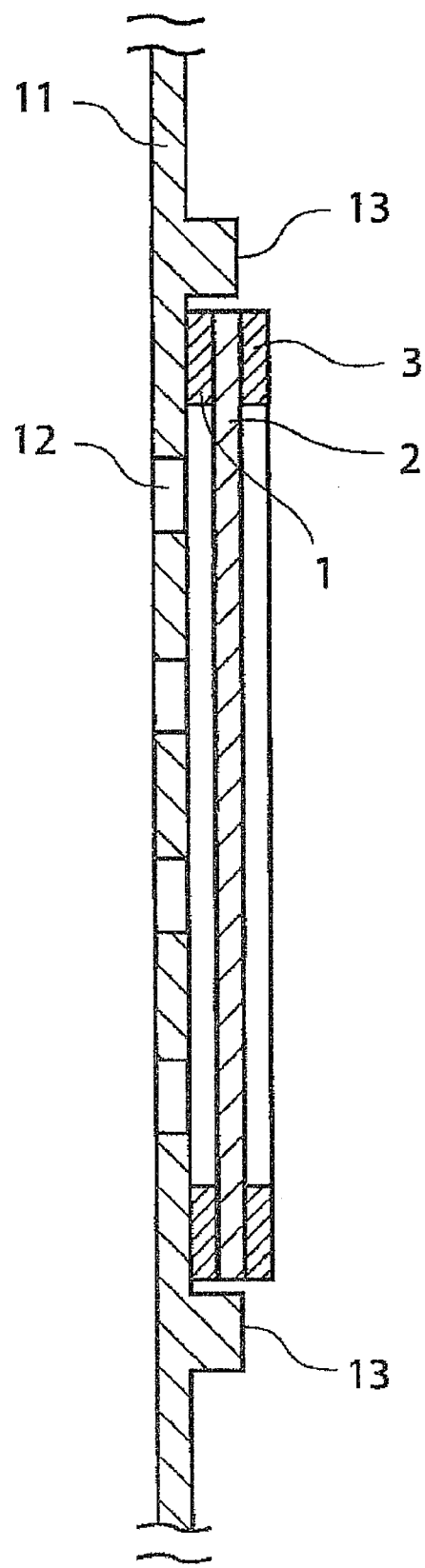
FIG. 10 is a cross-sectional view showing a conventional acoustic part.
Figure 11:
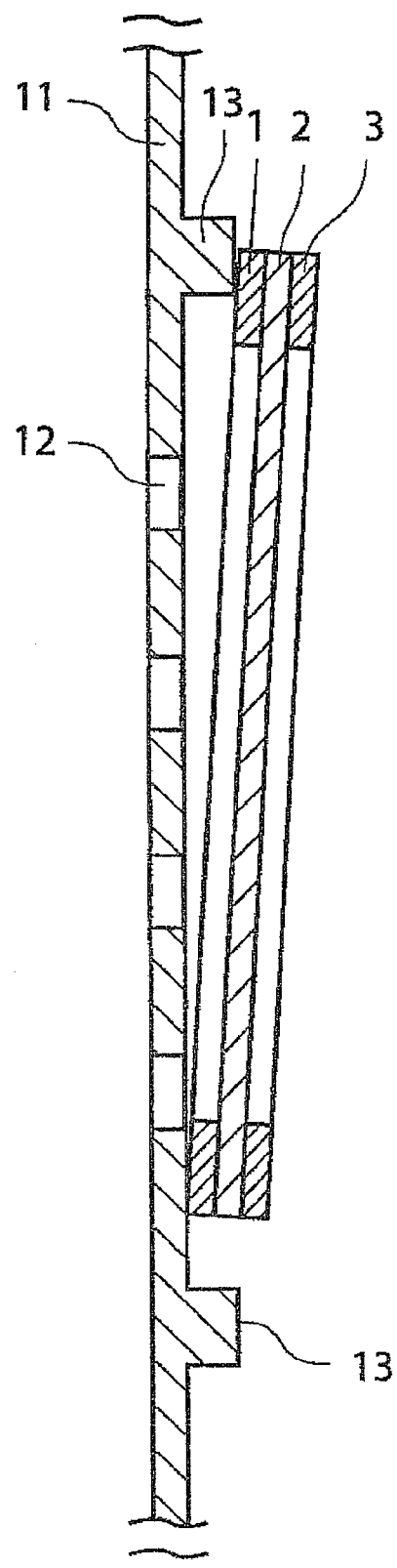
FIG. 11 is a cross-sectional view showing the conventional acoustic part.

As shown in FIG. 9, the adhesive layer 1, the waterproof film 2, the adhesive layer 3, and the separator 7 were stacked in layers in this order. As the waterproof film 2, a porous PTFE film was used, which was the same as that used in Test Production Example 1. As the adhesive layer 1, a double-sided pressure-sensitive adhesive tape a having a thickness of 0.20 mm was used. As the adhesive layer 3, a double-sided pressure-sensitive adhesive tape β having a thickness of 0.125 mm was used. As the separator 7, a PET film having a thickness of 0.075 mm was used. The separator 7 will be peeled off when the electroacoustic transducer is attached to the waterproof film 2. The separator 7 is formed to have a larger size than that of the adhesive layer 3, and therefore, such a structure is achieved that it is easy to peel off the separator 7 by holding the end portion thereof.

Test Production Example 3

As shown in FIG. 8, the adhesive layer 1, the waterproof film 2, the adhesive layer 3, and the frame member 4 were stacked in layers in this order. As the waterproof film 2, a porous PTFE film was used, which was the same as that used in Test Production Example 1. As the adhesive layer 1, a double-sided pressure-sensitive adhesive tape (available from Sumitomo 3M Limited; product number, VHB-Y4914; hereinafter referred to as the "double-sided pressure-sensitive adhesive tape γ") having a thickness of 0.25 mm, which was obtained by applying an acrylic pressure-sensitive adhesive to both sides of an acrylic foam backing material. As the adhesive layer 3, a double-sided pressure-sensitive adhesive tape 13 having a thickness of 0.125 mm was used. The frame member 4 (available form Rogers Inoac Corporation; product name, Poron; product number, SR-S48P; thickness, 0.30 mm) is used as a spacer between the waterproof filter and the electroacoustic transducer.

Test Production Example 4

As shown in FIG. 9, the adhesive layer 1, the waterproof film 2, the adhesive layer 3, and the separator 7 were stacked in layers in this order. As the waterproof film 2, a porous PTFE film was used, which was the same as that used in Test Production Example 1. As the adhesive layer 1, a double-sided pressure-sensitive adhesive tape γ having a thickness of 0.25 mm was used. As the adhesive layer 3, a double-sided pressure-sensitive adhesive tape β having a thickness of 0.125 mm was used. As the separator 7, a PET film having a thickness of 0.075 mm was used. Similarly to Test Production Example 2, the separator 7 will be peeled off when the electroacoustic transducer is attached. The separator 7 is formed to have a larger size than that of the adhesive layer 3, and therefore, such a structure is achieved that it is easy to peel off the separator 7 by holding the end portion thereof.

As the adhesive layer 1 or the adhesive layer 3, in addition to the materials described in Test Production Examples 1 to 4, there may also be used a double-sided pressure-sensitive adhesive tape (available from Dainippon Ink and Chemicals, Inc. (currently, DIC Corporation); product number, #8606TN) having a total thickness of 0.03 mm, which was obtained by applying an acrylic pressure-sensitive adhesive to both sides of a PET film backing material having a thickness of 0.006 mm; or a double-sided pressure-sensitive adhesive tape (available from Dainippon Ink and Chemicals, Inc.; product number, #8650S) having a total thickness of 0.1 mm, which was obtained by applying an acrylic pressure-sensitive adhesive to both sides of a PET film backing material having a thickness of 0.05 mm.

EXPLANATION OF SYMBOLS

1 Adhesive layer
1a Opening
2 Waterproof film
2x Unnecessary portion
3 Adhesive layer
4 Frame member
5 Adhesive layer
7 Separator
11 Housing
12 Sound hole
13 Step portion
21 Housing
22 Supporting member
23 Diaphragm
31 Release sheet
32 Die cutting roll

What is claimed is:

1. An acoustic part comprising a housing having at least one sound hole, an adhesive layer formed into a frame shape, and a waterproof filter attached so as to cover the sound hole with the adhesive layer interposed therebetween, wherein the housing is provided with a stepped portion for allowing the waterproof filter to engage therewith or a stepped portion as a marker showing an attachment position of the waterproof filter, and an outer peripheral portion of the frame-shaped adhesive layer is positioned at an inner side than an outer peripheral portion of the waterproof filter.

2. The acoustic part according to claim 1, wherein the peripheral portion of the waterproof film is folded back so that a valley is formed on the side of the adhesive layer.

3. The acoustic part according claim 1, wherein a liquid-repellant agent is added to a surface of the waterproof film.

4. The acoustic part according to claim 1, wherein the adhesive layer is a double-sided pressure-sensitive adhesive tape.

5. The acoustic part according to claim 1, wherein the waterproof filter comprises a waterproof film made of a fluororesin.

6. The acoustic part according to claim 5, wherein the fluororesin is porous polytetrafluoroethylene.

7. The acoustic part according to claim 1, wherein the waterproof filter further comprises a frame member attached to the waterproof film.

8. The acoustic part according to claim 7, wherein an outer peripheral portion of the waterproof film is positioned at an inner side than an outer peripheral portion of the frame member.

9. A method for manufacturing an acoustic part, which comprises: forming an adhesive layer into a frame shape on a release sheet; covering the adhesive layer with the waterproof filter; cutting the waterproof filter at an outer side than an outer peripheral portion of the frame-shaped adhesive layer; removing the release sheet from the adhesive layer; and attaching the adhesive layer side of the waterproof filter to a housing having at least one sound hole.

10. A method for manufacturing an acoustic part, which comprises: forming an adhesive layer into a frame shape on a release sheet; covering the frame-shaped adhesive layer with a waterproof filter formed into a larger size than that of the frame-shaped adhesive layer; removing the release sheet from the adhesive layer; and attaching the adhesive layer side of the waterproof filter to a housing having at least one sound hole.

* * * * *